United States Patent Office 3,419,205
Patented Dec. 31, 1968

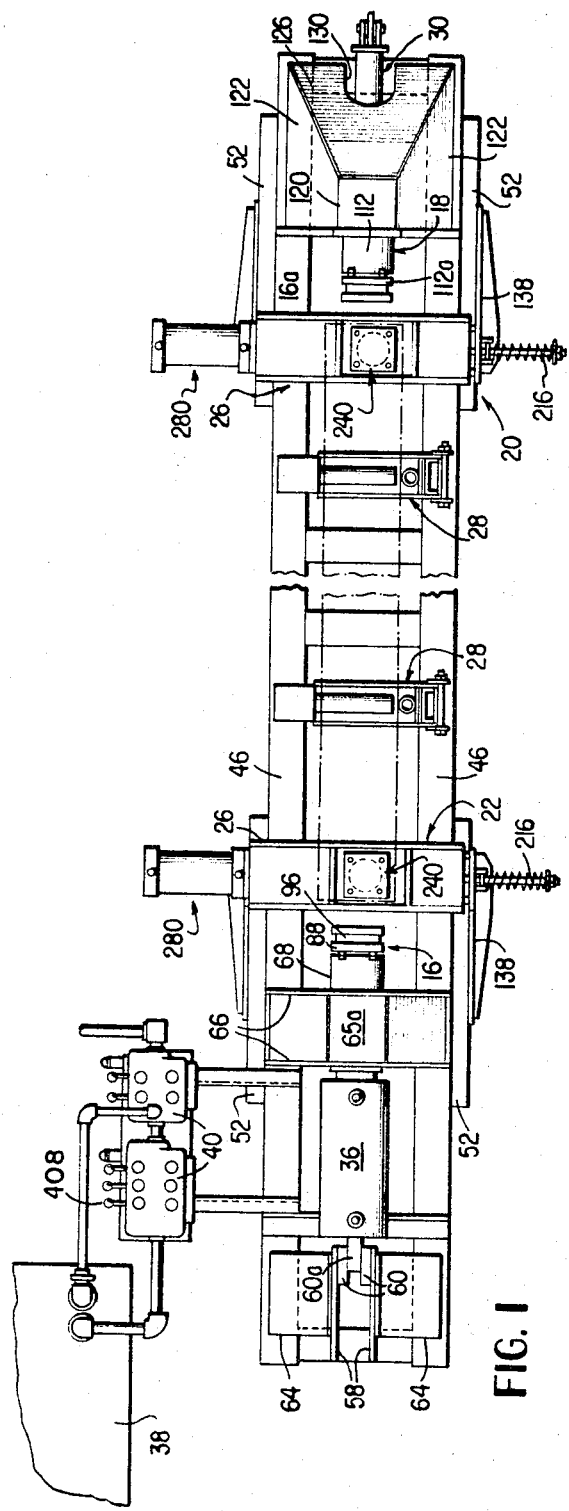
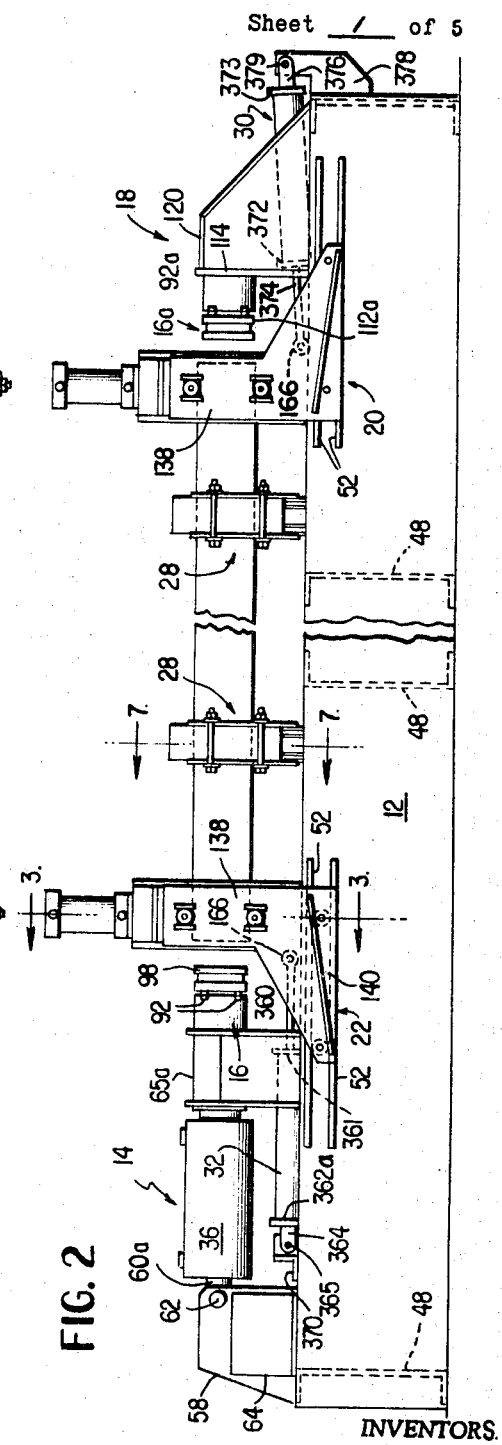
FIG. 1
FIG. 2
INVENTORS.
JOHN C. JURIET
BENJAMIN H. KUSHNER
BY
ATTORNEYS

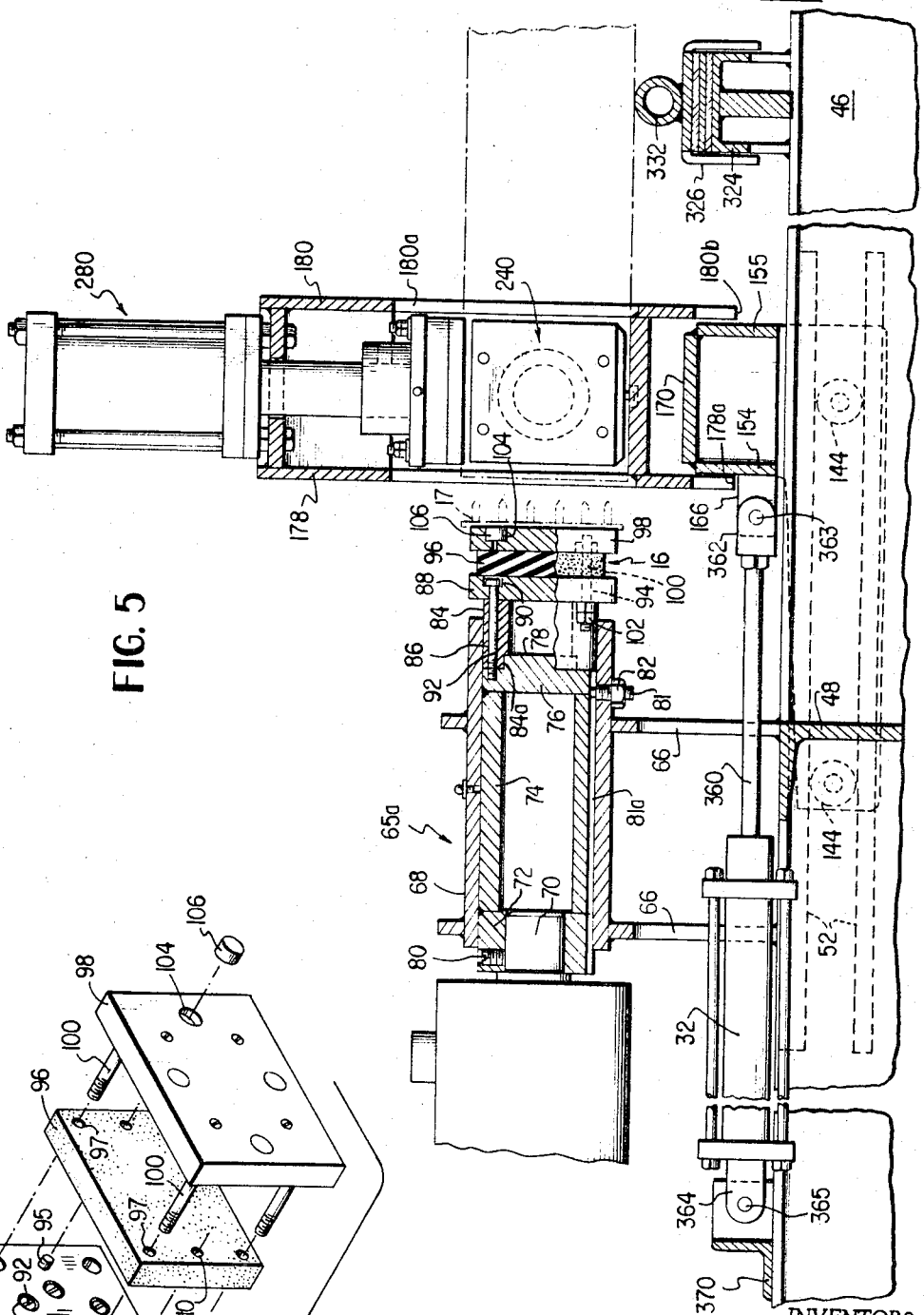
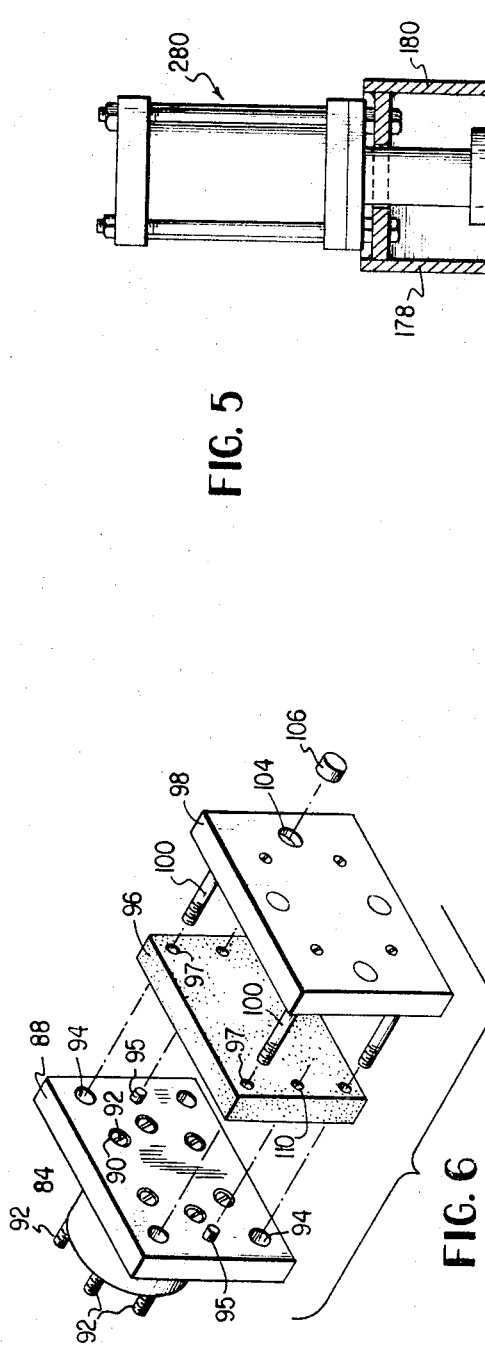
FIG. 5
FIG. 6
INVENTORS.
JOHN C. JURIET
BENJAMIN H. KUSHNER
ATTORNEYS.

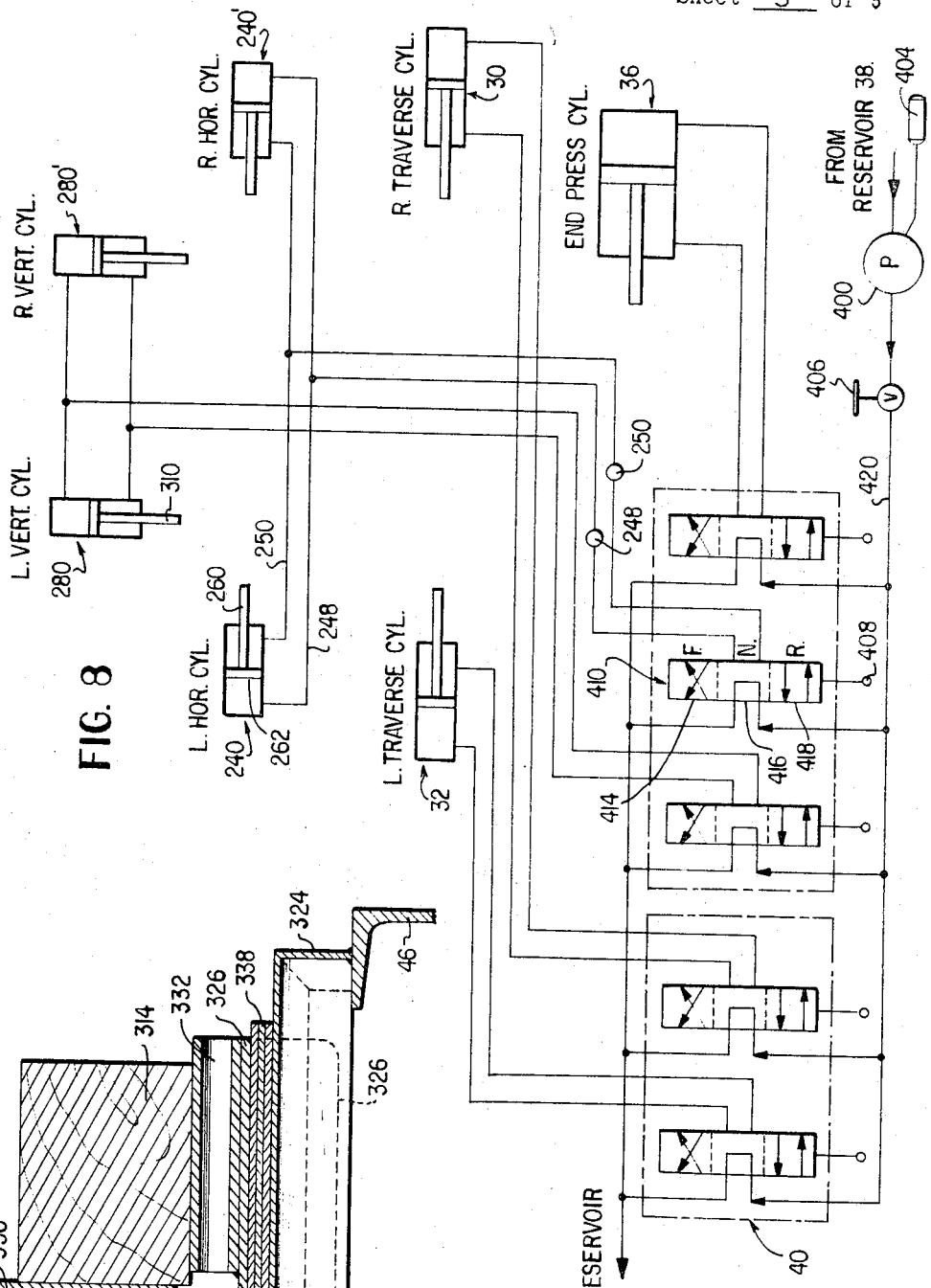

3,419,205
APPARATUS FOR FORMING REINFORCED
WOODEN MEMBERS
John C. Jureit and Benjamin H. Kushner, Miami, Fla., assignors to Automated Building Components, Inc., Miami, Fla., a corporation of Florida
Filed July 8, 1966, Ser. No. 563,908
30 Claims. (Cl. 227—152)

ABSTRACT OF THE DISCLOSURE

A machine for reinforcing and preventing and repairing splitting in the ends of elongated lumber elements, such as railroad ties, including a pair of carriages movably mounted on a support with each carriage carrying a press for supporting and clamping an end of the elongated lumber element. The carriages are movable into positions wherein the presses can clamp the element and are also movable in such a manner as to permit movement of the lumber element along its longitudinal axis. An additional press assemblage is provided for embedding the teeth of connector plates in the ends of the lumber element while they are clamped by the presses.

---

This invention relates to an apparatus and method for forming reinforced wooden members and more particularly relates to an apparatus and method for assembling metal connectors with lumber elements.

In the normal construction of railroad trackage, the rails are held in position on a series of lateral cross ties by means of railroad spikes imbedded in the ties. Due to seasoning, weathering and the extremes of temperatures to which the ties are exposed it is commonplace for cracks to develop in the tie ends in vertical planes running inwardly toward the railroad spikes in the center of the tie. Such cracks are inherently progressive in nature and their speed of progression is accelerated by the periodic pounding of the ties by passing trains. Also, freezing water in the tracks expands and through wedge action, progressive checking is induced in the railroad tie. As the cracks progress, the tie becomes an increasingly poor support for the rails, particularly since the cracking tends to accelerate any tendencies of the railroad spikes to withdraw or become loose in the tie. Various remedies for such splitting have been proposed in the past, but, for one reason or another, none have been completely suitably or universally used, so far as is known.

Other heavy lumber elements used in outdoor environments, such as the cross bars of telegraph and telephone poles, fence posts, and bridge and trestle timbers are similarly subject to splitting for some or all of the reasons mentioned above. The splitting problem is particularly aggravated where the lumber element is not of circular cross section, but is instead provided with a different cross section (usually rectangular). It has been established by the Forest Products Laboratory of the United States Department of Agriculture, at Madison, Wis., that splitting of wood occurs only after the moisture content drops to about 30–35%, the point at which wood shrinks. The shrinkage tangentially along the annular ring is greater than the shrinkage radially across the wood rings. It is this uneven degree of shrinkage that sets up stresses within the wood which exceed the bonding strength of the wood to cause a split.

In a log or pole, the annular rings are full circles which put in a fairly uniform stress on the wood within them, resulting primarily in a compressing action. However, when a log is sawed to make a lumber element of other than a circular cross section, the annular rings are cut, and the sections of annular rings tend to straighten as they shrink because the remainder of the ring is no longer present to balance the shrinkage stress. This action also causes warping in thin boards that do not have edge grain. Timbers of large cross sectional dimensions such as railroad cross ties and like which have a rectangular cross-section will usually crack or split through the pith (heart) across the narrow cross-sectional dimension. The straightening action caused by the shrinkage of the growth rings applies a stress on each side of the pith, in opposite directions. When the stress becomes greater than the split resisting strength of the wood, splitting results.

All anti-spitting devices previously proposed have been designed to resist the splitting forces created by shrinkage of the wood. Until the wood splits sufficiently to offset the shrinkage that caused the split, the device cannot be effective in controlling the split. To be effective an anti-splitting device must have sufficient strength and holding power in the wood to resist any splitting force which might develop and must remain in place through most of the life of the lumber element.

According to the present invention, it has been found that cross ties and other elements with incipient cracks may be reinforced to possess almost the original support strength and stability and it has been further found that uncracked ties may be reinforced in order to prevent or at least delay cracking and to hold the tie in a unitary form after cracking occurs, so that the cracking does not produce the deleterious effects previously mentioned.

Thus, it has been found according to the present invention that a new or exposed railroad tie may be effectively reinforced to greater prolong its useful life if the ends are forced together and held in position by means of a connector plate having a relatively large number of elongated nail-like teeth struck therefrom and imbedded in the tie with the axes of the teeth substantially parallel to the grain of the tie. A relatively large number of such teeth have been found desirable in order to distribute the stress and reduce the withdrawal tendency to which each tooth is subjected in service. As is commonly known, the withdrawal resistance of the common nail is less when the nail is driven parallel to the grain than when the nail is driven perpendicular to the grain. According to the present invention, large pluralities of nails are used to provide adequate withdrawal resistance and these are provided in nail-like form in order to maximize withdrawal resistance. That is to say, while it might be supposed that relatively short triangular teeth might be used for the same purpose, experience has shown that such teeth have relatively little withdrawal resistance so that the plate must be secured in a wooden member by some additional means, such as nails, bolts, or glue. This obviously would entail a greater expense in mounting the plates, and therefore is relatively unsatisfactory as a solution to the problem.

In the past, it has been commonplace to attempt to minimize splitting in railroad ties by applying so-called "irons" to the ends of the ties. Generally this is done prior to installing the ties and prior to the time that any significant spliting has occurred. The irons are conventionally applied by hammering or driving them into the ends of the ties either with or without a prior grooving or other cutting of the end to receive the iron.

According to the present invention, it has now been found that it is not only possible to reinforce the ends of such wooden elements as railroad ties, and the like, but that it is possible to do so according to a method and utilizing an apparatus which assembles reinforcing plates in such a manner as to result in a greater tie life than possible with the prior iron reinforcing practice. In addition, the apparatus and method of the instant invention permit the salvaging of seriously split ties and the like pieces of lumber as well as subjecting even slightly split lumber to assembly techniques which considerably lengthen the life of the unit.

The foregoing is accomplished according to the present invention by positioning an elongated wooden element substantially horizontal, clamping opposed sides of each end of the element so as to close both large and small cracks, and then embedding reinforcing plates at opposite ends of the wooden member by moving the teeth of the plates into the wooden member in a more or less gradual fashion as opposed to a hammering technique. According to the preferred embodiment of the invention, both ends of the wooden element are clamped, a toothed plate is forced into one end of the element which thereupon moves so that the element is forced onto the teeth of the other toothed reinforcing plate, while at the same time, the clamping means are moving simultaneously with the wooden element. Once the reinforcing plates are in position, the clamping means may be released, withdrawn longitudinally off the ends of the wooden element, and the element removed from the manufacturing device.

It is accordingly a principal object of this invention to provide a new and improved apparatus and method for peripherally compressing a wooden element at selective positions, while at the same time driving connector plates into the opposite ends thereof.

It is a further object of the invention to provide improved apparatus for preventing lumber splitting.

Another object of the invention is to provide an improved apparatus for minimizing the deleterious effects of a previous split in lumber elements.

A still further object of the present invention is to provide an improved railroad tie.

It is still another object of this invention to provide an improved railroad tie in which splitting is inhibited by a connector plate mounted in one or both ends of the tie with a relatively large number of elongated nail-like teeth struck from the connector plates and embedded in the lumber element with the axes of the teeth substantially parallel to the grain of the tie.

A still further object of the invention is to provide an improved lumber element of the foregoing type wherein the connector plate may be applied either before or after splitting has occurred.

Another object of the invention is to reduce splitting in lumber elements by applying peripheral compressive forces to selected surfaces adjacent the ends of a lumber element and concurrently applying connector plates to the opposite longitudinal ends thereof.

A still further object of the invention is to provide an apparatus and method for simultaneously compressing all of the surfaces adjacent the ends of a lumber element and concurrently pressing connector plates into the longitudinal ends thereof.

It is still another object of the invention to provide an apparatus for reinforcing an elongated lumber element utilizing one stationary platen means for holding a toothed plate, a movable platen means opposite the stationary platen means for holding a second toothed plate, support means for positioning the elongated element between the toothed plates in a substantially horizontal position, means for clamping the ends of the elongated lumber element, and means for moving the movable platen into the end of the lumber element to embed the teeth of both plates into the ends of the lumber while moving the lumber element and the clamping means along the longitudinal axis of the lumber element.

It is yet another object of the invention to provide a method for making reinforced wooden elements by positioning an elongated wooden element substantially horizontal, clamping opposed sides of each end of the element, and embedding two plates in opposite ends thereof by moving the teeth of one plate into one end of the element thereby driving its other end onto the teeth of the second toothed plate while the clamping devices move with the wooden element.

These and further objects and advantages of the invention will be more apparent upon reference to the following specification, claims, and appended drawings.

FIGURE 1 is a plan view of a novel apparatus constructed in accordance with the present invention;

FIGURE 2 is a side elevational view of the apparatus as shown in FIGURE 1 with the support members thereof broken away;

FIGURE 5 is a fragmentary view taken along the plane 5—5 of FIGURE 4 and illustrates a magnetically supported connector plate proximate to one end of a railroad tie which is concurrently being compressed along the four surfaces thereof;

FIGURE 6 is an exploded view illustrating the structural make-up of an end pressing platen;

FIGURE 7 is a vertical section taken along the plane 7—7 of FIGURE 2 and illustrates the working relationship between the structural elements of the adjustable tie support to center the railroad tie; and FIGURE 8 is a schematic diagram of the hydraulic system employed to operate the various units of the apparatus.

Figure 3:
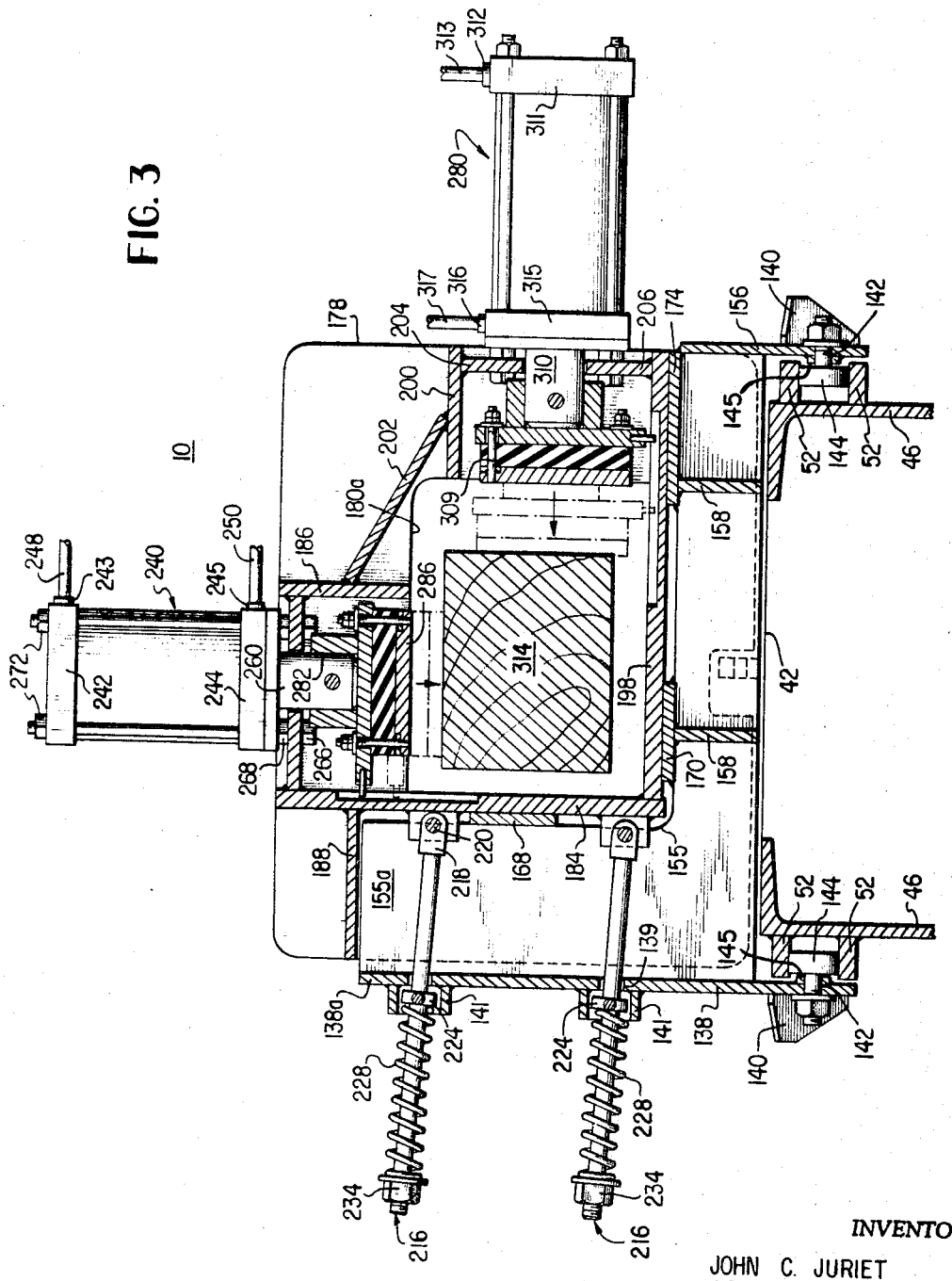
FIGURE 3 is a side elevational view taken along the plane 3—3 of FIGURE 2 and illustrates the carriage assembly and press sub-assembly of the apparatus constructed in accordance with the present invention.

Referring to the drawings and more particularly to FIGURES 1 and 2, there is shown a hydraulically actuatable embodiment of a manufacturing, anti-splitting or reinforcing apparatus constructed in accordance with the present invention indicated generally by the numeral 10. The device includes a main tie press frame assembly or bed 12 upon which the other elements of the apparatus are mounted. The left end of the frame assembly 12 carries the movable platen end press assembly indicated generally at 14 while the right end of the frame assembly carries the stationary platen end reaction assembly indicated generally at 18. The movable platen assembly 14 is provided with a longitudinally movable end pressing platen indicated generally at 16, while at the same time, the end reaction assembly 18 is provided with a similar type fixedly mounted pressing platen indicated generally at 16a. A pair of hydraulically controlled press assemblies indicated generally at 26, are mounted respectively upon a right hand carriage assembly 20 and a left hand carriage assembly 22. The carriage assemblies 20 and 22 are mounted on frame assembly 12 for longitudinal movement and positioning therealong. Positioning of the right hand carriage assembly 20 is accomplished by way of right hand traverse hydraulic cylinder 30, while positioning of the left hand carriage assembly 22 along the frame assembly 12 is provided by way of left hand traverse hydraulic cylinder 32. A pair of adjustable railroad tie supports 28 are mounted in spaced apart positions along frame assembly 12, for positioning the lumber element elevationally and transversely upon the frame assembly. An end press hydraulic cylinder 36 controls the movement of the longitudinally movable end pressing platen 16 and drives into the ends of the lumber suitable reinforcing or connector plates which are fixedly held to pressing platens 16 and 16a. A suitable hydraulic assembly, shown generally by the numeral 38, and including control section 40 provides the means for the operation and manipulation of the apparatus 10.

Figure 4:
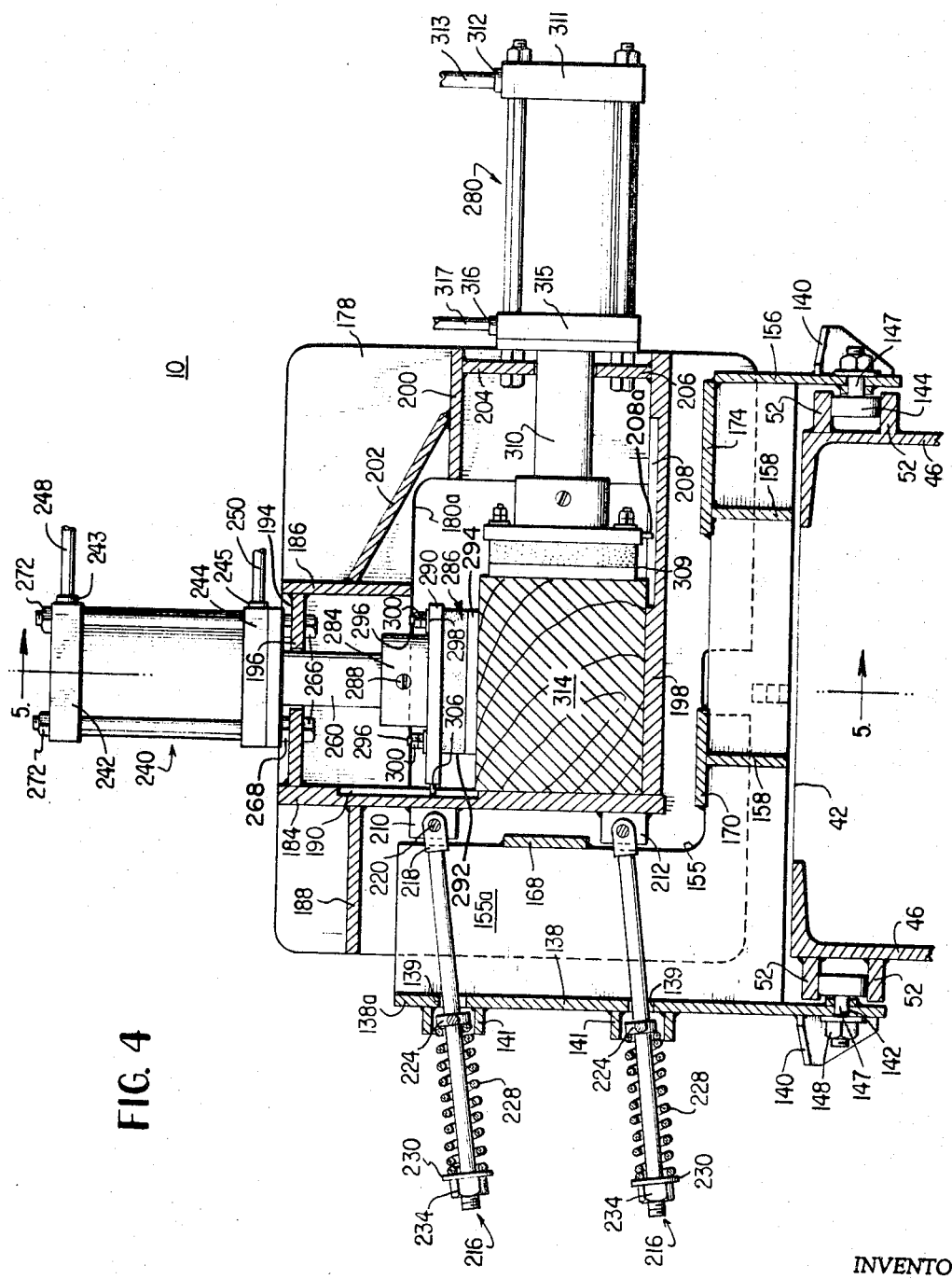
FIGURE 4 illustrates the carriage assembly and press sub-assembly as shown in FIGURE 3 upon the presses assuming a compressing position about the periphery of a railroad tie proximate the end thereof.

The frame assembly 12 comprises a hollow, rectangular steel frame including a pair of side channel members 46 which extend along the longitudinal expanse of the frame, see FIGURES 3 and 4. These are connected by a plurality of transverse channel shaped steel stiffeners or support members 48 spaced along the longitudinal expanse of frame 12, see FIGURE 1. The rectangular steel frame 12 may be further provided with reinforcing members and gusset plates, not shown, as may be needed to provide a structurally rigid support base. Longitudinally spaced pairs of aligned opposed rails 52 are fixedly mounted on opposite sides of the side channels 46 for a purpose presently to become apparent.

The end press hydraulic cylinder 36 is mounted at the left end of the frame assembly by a pair of L-shaped hydraulic cylinder bracket support plates 58 mounted in opposed position atop the left end of the frame as shown in FIGURES 1 and 2. The bracket plates 58 are secured to the frame 12 by the horizontal flanges 64. Projecting inwardly of the bracket plates 58 in opposed relationship to each other are a pair of bosses 60. The bosses 60 are provided with aligned apertures to fixedly position one end of hydraulic end press cylinder 36 by means of a pin 62 passing through the apertures and through a mounting lug 60a on the cylinder 36, see FIGURES 1 and 2.

As shown in FIGURE 1 and explained, the rearward end of hydraulic end press 36 is pivoted between the upright bracket plates 58, this pivotal connection eliminating the need for accurate alignment of a series of elements. At the same time the forward end of the hydraulic end press 36 is maintained in proper position by means of a hydraulic cylinder guide support assembly indicated generally at 65a, as best seen in FIGURES 1, 2 and 5. The guide support assembly includes a pair of parallel upstanding members 66 welded to the top of the frame 12, see FIGURE 5. As shown in FIGURES 1 and 2, a cylindrically shaped guide tube 68 projects longitudinally through the spaced support members 66 and is welded thereto. Longitudinally movable end pressing platen 16 is shown to be telescopically associated with cylindrical guide tube 68. The structural and operational cooperation between the above described elements will now be outlined in greater detail in connection with the description of FIGURE 5.

As shown in FIGURE 5, a pair of equal diameter cylindrical slide members 72 and 74 are fixedly connected together, as by welding, and are telescopically slidably received within cylindrical guide tube 68. The bore of the cylindrical slide member 72, while coaxial with bore of the more elongated cylindrical slide member 74 is of substantially smaller diameter. The other end of the elongated cylindrical slide member 74 is provided with a cylindrical cap 76 which is fixedly attached thereto by welding or any other suitable means. The cylindrical cap 76 has a boss or central projection 78. The cap 76 is also provided with a plurality of threaded recesses, proximate the periphery thereof, for threaded attachment to the end press platen assembly 16.

As shown by FIGURE 5, the cylindrical slide 72 has a central bore having a diameter substantially equal to the outside diameter of the end of the piston 70 of hydraulic end press cylinder 36 and is secured thereto by a set screw 80. Accordingly, longitudinal movement of piston 70 will result in the concurrent movement of cylindrical slide members 72 and 74, cylindrical cap 76, and, finally, the end pressing platen 16. In order to prevent rotation of the elements 72, 74 and 76 within the bore of cylindrical guide tube 68, a guide pin 81 is shown to project inwardly to be received in a longitudinal keyway 81a. Guide pin 81 is externally threaded to receive a hexagonal lock nut 82.

End pressing platen 16 magnetically supports the multitoothed connector plates 17 for pressing into the ends of the lumber members at pre-established points of the operational cycle. In order to accommodate for irregularity in the ends of the lumber members, a unique pressing platen design is provided. As shown in FIGURES 5 and 6, pressing platen assembly 16 comprises a hollow cylindrical sleeve 84 having a continuous outer surface slidably receivable within the bore of the support tube 68. The left end of the bore in the sleeve 84 has an increased diameter portion 84a which receives the projection 78 of cylindrical cap 76. In addition, sleeve 84 is provided with a plurality of apertures 86 formed symmetrically about the center thereof proximate its perimeter. Apertures 86 are aligned with the threaded recesses formed in the cylindrical cap 76.

A rectangularly platen plate 88 is provided with a plurality of countersunk apertures 90 aligned with the apertures 86 of sleeve 84 and with the threaded apertures formed in cylindrical cap 76. A bolt 92 is shown in FIGURE 5 to extend through the aligned apertures in platen plate 88, sleeve and cap 76 to threadedly affix the enumerated elements to each other. Platen plate 88 is also provided with apertures 94 proximate each of its corners, as may be seen in FIGURE 6. Lastly a pair of centering or positioning pins 95 are secured on opposite sides of platen 88.

A rubber platen pad 96 made of any suitable resilient flexible material such as "Elastacast" is sandwiched between platen plate 88 and a pressing platen 98 in the manner shown in FIGURE 5. In this way, any irregularities in the ends of railroad ties or other type of lumber members is automatically compensated for by the resilient pad 96. The rubber platen pad 96 is provided with apertures 97 in each of its corners, aligned with the apertures 95 in platen plate 88 for mounting thereto. In addition, a pair of apertures 110 are provided on opposite sides of the rubber platen pad 96 mediate the corner apertures for receipt of the projecting centering pins 95.

Pressing platen 98 is provided with fixedly mounted threaded studs 100 projecting from each of its corners for passage through corner apertures 94 of platen plate 88 and corner apertures 97 of rubber platen pad 96. Hexagonal nuts 102, see FIGURE 5, threadedly engage the threaded ends of projecting studs 100 to couple platen plate 88, resilient platen pad 96, and pressing platen 98 together. It will be appreciated that the studs 100 are slideable through the various apertures to permit compression of the resilient pad 96 between plate 88 and platen 98. In addition a plurality of recesses 104 is provided on the outer surface of pressing platen 98 to receive small cylindrical magnetic inserts 106. Magnetic inserts 106 are received into recesses 104 such that a flat coplanar outer surface results.

Aligned with end pressing platen assembly 16 for engagement with the opposite end of a railroad tie or other lumber element is a similarly made platen assembly 16a. As shown in FIGURES 1 and 2 a platen mount tube 112 carries a plate 112a to which the platen assembly 16a is secured by studs and nuts 92a. The end pressing platen assembly 16a includes the same structural elements as those previously discussed in connection with the description of FIGURE 6 to enable automatic adjustment for irregular lumber member ends. In addition, magnetic inserts are provided so that a connector plate will magnetically be held in alignment with the longitudinal end of a railroad tie for pressing thereinto. However, whereas the previously discussed end pressing platen assembly 16 was mounted upon piston 70 for longitudinal movement therewith upon actuation of hydraulic cylinder 36, the opposed end pressing platen assembly 16a, which is aligned with end pressing platen assembly 16, is rigidly and fixedly positioned in immovable fashion to press a magnetically held connector plate into the opposite end of the railroad tie upon movement of the same thereinto by the action of the hydraulic cylinder 36. As can be appreciated, the platen mount tube 112 and its associated platen mount stud must be rigidly fixed in order to be able to withstand the ramming action imposed thereupon by the hydraulic cylinder 36 and the railroad tie.

To this end, platen mount tube 112 is rigidly positioned by way of a truncated semi-pyramid type structure which includes end plate 114, rigidly fixed in an upright position by welding to frame assembly 12, top plate 120, side gusset plates 122 and rear plate 126, see FIGURE 1. The elements last mentioned are fixedly positioned one to the other by way of welding or other suitable means. In addition the bottoms of side gusset plates 122 and rear face plate 126 are welded in position to the frame assembly 12. Accordingly, forces exerted upon the platen mount tube 112 by the ramming of the railroad tie thereagainst are adequately withstood. Rear plate 126 is provided with an opening 130 to permit the projection therethrough of the right hand traverse hydraulic cylinder 30. This will be described in more detail hereinbelow.

FIGURE 1 shows both right hand and left hand carriage assembly structures 20 and 22 each capable of selective differential positioning along the longitudinal expanse of the frame upon rollers 144 received in tracks 52. In the interest of brevity, since the structure of right hand carriage assembly 20 is exactly the same as the left hand carriage assembly 22, only the right hand assembly will be described.

Each carriage assembly 20 and 22 is provided with a vertically disposed generally L-shaped side plate 138 each having a tapered plate 140 angularly welded thereto in the manner as shown in FIGURES 1 through 4. Each plate 138 is provided with a pair of spaced apertures 142 for mounting rollers 144. To this end bosses 145 project inwardly of the side plate 138 around the apertures 142. Rollers 144 are provided with suitable axles 147, which in turn are secured to bosses 145 through apertures 142. The outer ends of the axles 147 are provided with threads for engagement with nuts 148 for fastening the rollers to the side plate 138. In addition L-shaped side plates 138 are provided with a pair of aligned, vertically spaced apart apertures 139 for receipt of a pair of spring rods which are associated with the press sub-assembly presently to be described. Fixedly connected to side plates 138, about apertures 139, are apertured trunnion bearing housings 141. Suitable spring trunnions 224 are mounted within the trunnion bearing housings 141 and cooperate with the spring rods of the press sub-assemblies to pivotally carry the same relative to the right and left hand carriage assemblies between non-pressing and pressing positions about a lumber element. The structural relationship between the carriage assemblies and the press sub-assemblies will be discussed in greater detail hereinafter.

Referring to FIGURE 4, the side plates 156 form the opposite overhanging side of the right and left hand carriage assemblies. Each of sides 156 are provided with an angularly disposed plate 140, similar to that of sides 138. In addition, rollers 144 are journalled for rotation into sides 156. The rollers 144 are received within spaced apart, aligned tracks 52 provided along side plate 46 for longitudinal positioning of the carriage assembly at selective positions therealong. In operation tracks 52 cooperate with their similarly positioned counterparts on the opposite side of the frame assembly to enable movement of the carriage assemblies.

Sides 138 and 156 of the right and left hand carriage assemblies are interconnected by substantially L-shaped spaced apart transversely extending members 154 and 155, see FIGURE 5. As shown in FIGURES 3 and 4, the upright legs 155a of the L-shaped members 154 and 155 are fixedly connected to the upright portions 138a of the L-shaped side plates 138. Accordingly, transverse members 154 and 155 extend to the same elevational position as the L-shaped side plates 138. The upright portions 155a of transverse members 154 and 155 are interconnected by a first pad 168, as shown in FIGURES 3 and 4, to provide support and a rest position for the press sub-assembly which is carried thereupon. In like manner, the transversely extending portions of sides 154 and 155 are interconnected by pads 170 and 174 and vertical members 154 and 155 to provide a base support and rest position for the press sub-assembly which is carried thereupon.

It will thus be appreciated that the carriage assemblies comprise carriages rollable along the tracks 52 and including vertically upstanding portions comprised of plates 138a, 154a and 155a and horizontally disposed portions comprised of plates 154 and 155 cross braced by pads 170 and 174 and plates 158.

A lug 166, see FIGURE 5, is attached to, and projects centrally of, transverse side 154 of the left hand carriage assembly. Lug 166 would of course project from side 155 for the right hand carriage assembly. The lug 166 is connected by a pin 363 to a bifurcated connector 362 carried by the piston 360 of the cylinder 32. As shown in FIGURE 5 lug 166 provides the means for connection to the piston of the left hand traverse hydraulic cylinder. In similar manner the lug 166 of the right hand carriage assembly cooperates with the piston of right hand traverse hydraulic cylinder 30. Accordingly, upon actuation of cylinders 30 or 32 movement of the right or left hand carriage assemblies is provided. The carriage assemblies are slightly spacially elevated above the top of frame assembly 12 by the elevational rolling relationship between tracks 52 and rollers 144, see FIGURE 3. In this manner the carriage assemblies are longitudinally freely movable along the frame 12 in accordance with the dimension of the lumber element to be positioned thereupon. Both the right hand and left hand carriage assemblies 20 and 22 respectively are provided with press sub-assemblies which will now be described.

Referring now to FIGURES 3, 4 and 5, the press sub-assemblies 26 are each provided with a pair of substantially rectangular vertical and parallel side plates 178 and 180 which are rectangularly apertured at 180a, through which apertures the lumber element may extend. The lower edges 178a and 180b of vertical plates 178 and 180 are slidably received over the transverse plates 154 and 155 of the carriage assemblies. The vertical and parallel side plates 178 and 180 of the press sub-assemblies are attached together by means of a pair of heavy press bed or pressure plates 184 and 198 mounted at right angles to one another and welded together at their juncture to form a bed for the wooden element being handled, such as the railroad tie 314 illustrated in FIGURES 3 and 4. In addition to these fastening elements, the vertical plates 178 and 180 are also attached by means of ribs 186, 188, 200 and 202. Rib 186 is spaced away from press bed or pressure plate 184 in a throat defining manner and, with pressure plate 184, receives an apertured mounting plate 194 which is fixedly connected between plates 178 and 180, pressure plate 184, and rib 186 in a manner as shown in FIGURE 4. Mounting plate 194 is provided with an aperture 196 substantially centrally thereof for passage of a piston associated with a hydraulic cylinder in a manner to be explained hereinafter.

The rib 200 which extends between side plates 178 and 180 is spaced from pressure plate 198 and defines a throat or passage therewith. Mounted between parallel rib 200 and pressure plate 198, substantially perpendicular thereto, is a mounting plate 204. Mounting plate 204 is welded between rib 200 and pressure plate 198 and in addition has its other ends welded to side plates 178 and 180. Mounting plate 204 is provided with an aperture centrally thereof for projection therethrough of a piston which is associated with the horizontal hydraulic cylinder and will be described in more detail hereinafter.

Pressure plate 184, is provided with a pair of integrally formed, vertically aligned, spaced apart pivot blocks 210 and 212. Pivot blocks 210 and 212 are provided with an aperture therethrough for receipt of a pivot pin 220. Spring rods 216 having bifurcated heads 218 with aligned apertures in the opposed jaws enable pivotal connection to pivot blocks 210 and 212. After positioning rod head 218 about the pivot blocks, pivot pin 200 is inserted to pivotally fix the spring rod to the pivot blocks 210 and 212 respectively. Spring rods 216 extend to the upright ends of transversely extending sides 154 and 155 of carriage assemblies 20 and 22. As discussed hereinbefore, the angularly L-shaped side plates 138 are provided with a pair of aligned, vertically spaced apart apertures 139 for extension of spring rods 216 therethrough. Fixedly connected to side plates 138, about apertures 139, are apertured trunnion bearing housings 141. Pivotally mounted within trunnion bearing housing 141 are spring trunnions 224. Spring trunnions 224 slidably receive spring rods 216 and permit both vertical and horizontal movement of the press sub-assemblies. Springs 28 which are concentrically mounted about the ends of rods 216 project beyond side plate 138 and provide the biasing force for returning the press sub-assemblies to their at rest positions shown in FIGURE 3. The springs are held in position about the spring rod by flat washers 230 and nuts 234 which engage threads formed along the terminal end of the spring rods 216 to bias the spring between the flat washers 230 and the spring trunnions 224. It should be appreciated that in the at rest or non-pressing position of the press sub-assembly 26, that shown by FIGURE 3, springs 228 are capable of maintaining the pressure plates 184 and 198 seated upon metallic pads 168 and 170, 174 respectively. Upon actuation of the vertical and horizontal clamping cylinders of the press sub-assemblies 26, pressure plates 184 and 198 will be moved concurrently with, and as a result of, movement of side plates 178 and 180, inwardly and upwardly to the positions shown in FIGURE 4, from their normal or rest positions as shown in FIGURE 3. In assuming the position shown in FIGURE 4, spring rods 216 pivot about pivot blocks 210, 212 and spring trunnions 224 and slide through the latter against the bias of the springs. Upon return of the horizontal and vertical clamping cylinders to rest position, the pressure plates 184 and 198 will automatically be returned to their normal positions abutting pads 168, and 170, 174. The pressing platens will then be moved away from the lumber structure to which it had previously been clamped and removal of the same can now be accomplished.

The hydraulic mechanism for moving the pressure plates 184 and 198 of the press sub-assemblies 26 from their normal positions to their clamping positions about a railroad tie or other wooden element is responsive to the control section 40. The press sub-assemblies are each provided with a horizontal surface hydraulic clamp cylinder 240 and a vertical surface hydraulic clamp cylinder 280 of similar design. Accordingly, in the interest of brevity only cylinder 240 will be described in detail. Each of the hydraulic clamp cylinders 240 and 280 are provided with end plates including a socket 243 for connection with a flexible hydraulic line 248. Flexible hydraulic line 248 is connected through a four-way valve, described hereinafter in connection with FIGURE 8, to the high pressure output side of a hydraulic pump and to a return line leading either to the sump of the hydraulic system or to the low pressure input side of a pump. The four-way valve alternately connects the line 248 to the output or to the return line so that hydraulic fluid is alternately supplied to and exhausted from the fluid chamber between the piston head (not shown) of piston 260 and the top of the cylinder 240. Mounted on the end of hydraulic cylinder 240 opposite to that of end plate 242 is an end plate 244 having a socket 245 for connection to a flexible hydraulic line 250. Flexible hydraulic line 250, similar to line 248, alternately supplies or exhausts pressurized fluid from the fluid chamber between the piston head and the bottom of cylinder 240. End plates 242 and 244 are provided with aligned apertures proximate the corners thereof for receipt of clamping studs 266. Accordingly, the horizontal surface hydraulic clamp cylinder 240 is connected by way of studs 266 and clamping nuts 272 to mounting plate 194 in a rigid, stationary position. As shown in FIGURES 3 or 4, suitable nuts or spacers 268 may be provided between adapter 244 and the mounting plate 194. Upon the mounting of the horizontal surface hydraulic clamp cylinder 240 to mounting plate 194, piston 260 projects through aperture 196 in the manner shown. Accordingly, if fluid is inserted into flexible hydraulic line 248 downward positioning of the piston 160 results, and on the other hand if fluid is inserted into flexible hydraulic line 250 upward movement of piston 260 will result. Accordingly, movement of the piston results in the desired upward or downward movement of the horizontal clamp pressing platen 286 associated therewith.

As shown in FIGURES 3 or 4 horizontal clamp pressing platen 286 generally consists of an annular mounting hub 284, and a flexible or resilient pressing platen pad 286. Annular mounting hub 284 is provided with a bore 282 which is substantially equal to the diameter of piston 260. In addition, hub 284 is provided with either one or a plurality of radial threaded apertures 288 into which set screws are threadedly received for clamping the annular hub 288 to the piston 260. Annular hub 284 is fixedly connected, as by welding for example, to a hub platen plate 290 for rigid association therewith. Pressing platen 286 is structurally similar to that of end press platen assembly 16, described hereinabove in connection with FIG. 6, in that a hub platen plate 290, a resilient rubber platen pad 292 and a pressing platen plate 294 are provided. As shown in FIGURE 3 the hub platen plate, rubber platen pad, and pressing platen plate are provided with a series of aligned apertures for receipt of studs 296 projecting from the pressing platen. Pressing platen plate 294 and the resilient rubber platen pad 292 are fixedly connected to hub platen plate 290 by the threaded engagement of hexagonal jam nuts 300 about the threaded ends of the projecting studs 296. In addition a washer 298 may be provided if necessary. Accordingly, the horizontal surface clamp pressing platen 286 is fixedly connected to the piston 260 for reciprocal movement therewith. A guide pin 306 projects outwardly from one end of hub platen plate 290 for vertical reciprocal movement in the elongated vertical guide pin recess 190 formed in pressure plate 184.

In similar fashion vertical surface clamp pressure platen 309 is fixedly attached to piston 310 of vertical surface hydraulic clamp cylinder 280 for reciprocal movement therewith. Similar to the action of horizontal surface clamp cylinder 240, hydraulic fluid flowing into vertical surface clamp cylinder 280 by way of a suitable four-way valve, end plate 311, socket 312 and flexible line 313 to result in transverse inward movement of pressing platen 309. Furthermore, upon hydraulic fluid being provided to end plate 315, socket 316 and flexible line 317, piston 310 will be returned to its original non-engaging position. Vertical surface hydraulic cylinder 280 is fixedly mounted to mounting plate 204 in a manner similar to that in which horizontal surface cylinder 240 is connected to mounting plate 194. Furthermore structurally and cooperatively the connection of pressing platen 309 to piston 310 is in all detail the same to that hereinabove described in connection with cylinder 260. The pressing plate of platen 309 carries a pin 208a riding in guide slot 208.

The rigid interconnection of cylinders 240 and 280 to mounting plates 194 and 204 respectively results in the formation of a novel center closing press. More particularly, fluid flowing through hydraulic fluid line 248 into cylinder 240, will result in a downward movement of piston 260. Accordingly, since the horizontal surface clamp pressure platen 286 is fixedly connected to piston 260, a vertically downward movement will result thereto. At the same time, a transversely inward movement is being applied to piston 310 and its associated pressing platen 309 by similar actuation of vertical surface hydraulic clamp cylinder 280. Upon the horizontal surface clamp pressing platen 286 engaging the upper peripheral surface of lumber element 314 adjacent the end thereof, and the vertical surface clamp pressure platen engaging the vertical peripheral surface of railroad tie 314, there results an upward movement of cylinder 240 and outward movement of cylinder 280. Since the cylinders are fixedly attached to mounting plate 194 and 204, an upwardly and outwardly directed force will be transmitted to the side frames 178 and 180 due to mounting plates 194 and 204 being fixedly connected thereto, to shift the side frames against the force of biasing springs 228. As a result pressure plates 184 and 198 will be shifted from their non-pressing positions of FIGURE 3 to their pressing positions of FIGURE 4. As a result, a clamping of the railroad tie along all four peripheral edges will be accomplished.

The press sub-assembly will maintain its clamped position about railroad tie 314 until pressurized fluid is forced, by way of hydraulic fluid lines 250 and 286, into the chamber between the piston head and the bottom of cylinder 240 and the piston head of piston 310 and the bottom of its cylinder 280. Upon such an occurrence, a concurrent upward movement to piston 260 and an outward movement of piston 310 will occur. The result is that pressure plates 184 and 198 will assume their normal rest position upon metallic pads 168, and 170, 174 respectively. As a result of the outward and downward movement of pressure plates 184 and 198 respectively, spring rods 216 will be pivoted to their normal biasing position shown by FIGURE 3 to retain the pressure plates in their unclamped positions until an actuating force is reapplied to the hydraulic cylinders 240 and 280 respectively.

Because of the alignment of the plate carrying platens and the concurrent actuation of the horizontal surface 240–240' and vertical surface 280–280' hydraulic cylinders of right hand 20 and left hand 22 carriage assemblies respectively, it is necessary that the railroad tie 214, or other lumber structure, be centered both elevationally and transversely of the frame 12. To this end, adjustable railroad tie supports for centering the same elevationally and transversely within the press are provided. These are generally indicated in FIGURES 1 and 2 by the numeral 28.

As shown in FIGURE 7 the adjustable railroad tie support includes a sub-assembly having channel shaped vertical support member 320 and channel shaped transversely extending support base 324 welded to side channel members 46 or the frame assembly 12. As shown by FIGURES 1 and 2, a pair of adjustable railroad tie supports 28 are provided along the longitudinal expanse of the tie frame assembly 12. The vertical channel 320 is welded to the transversely extending channel shaped sub-assembly support 324 in a substantially L-shaped fashion as shown by FIGURE 7. An L-shaped support frame is provided having a channel shaped vertical section 328 overlying the vertical channel 320, and having a transversely extending channel shaped leg 326 overlying the transversely extending sub-assembly leg 324, all as seen in FIGURES 1 and 7. A pair of aligned transversely spaced apart bolt lugs 329 and 331 are fixedly connected to the sides of the channel shaped vertical support frame 328. The bolt lugs are provided with aligned apertures to receive bolts 333 therebetween. In addition, a short run of vertically extending pipe 330 is welded to channel shaped vertical support frame 328 and provides an arcuate vertical positioning surface for a side of railroad tie 314. In a like manner, a short run of horizontally extending pipe 332 is welded to the channel shaped bottom support frame 326 to provide an arcuate support surface for the bottom of railroad tie 314.

Since the integrally formed support frame 326–328 is removably fixedly attachable to the support sub-assembly 320–324 by way of bolts 333, it is possible to elevationally and transversely center a railroad tie between the pipe supports 330 and 332 by suitable shim plates. Accordingly, as shown by FIGURE 7, three shim plates 338 are shown to be inserted between the channel shaped sub-assembly 324 and the overlying support frame 326. Likewise, a pair of shim plates 340 are shown to be inserted between the vertical portion of support frame 328 and the channel shaped vertical sub-assembly 320. Lastly, storage space for unused shim plates is provided between the vertical sub-assembly 320 and the support frame 326–328.

In the above manner, an adjustable centering of the lumber structure transversely and elevationally of the tie press frame assembly 12 is accomplished.

The manner in which carriage assemblies 20 and 22 are selectively longitudinally positioned along tracks 52 will now be discussed. As shown in FIGURES 1 and 2 a left traverse hydraulic cylinder 32 is fixedly mounted to the frame or bed 12. More particularly, left traverse cylinder 32 is provided with end plates 361 and 362a to permit the alternate supply of pressurized fluids to opposite sides of the piston reciprocally mounted therewithin. Since the structure and cooperation of hydraulic cylinder 32 is similar to that which was discussed in great detail hereinabove in connection with the horizontal surface hydraulic cylinder 240 and vertical surface hydraulic cylinder 280 of press sub-assemblies 26, a detailed discussion thereof will not be repeated. As shown in FIGURE 1 piston 360 is provided with an appropriate connector head 362, see FIGURE 5 and the related discussion hereinabove, for connection with projecting lug 166 from transverse sides 154 of the carriage assembly. While any suitable means to connect the end of piston 360 to the lug 166 may be provided and utilized, FIGURE 5 illustrates the connection by way of a pivot pin 363. End 362 of the left traverse cylinder 32 is provided with a suitable mounting projection 364. In addition, a suitable carriage cylinder bracket 370 is welded to the frame or bed 12. Mounting projection 364 is fixedly attached to the carriage cylinder bracket 370 by means of a suitable connecting pin 365. Accordingly, depending upon the direction of pressurized fluid supply, the left hand carriage assembly will be moved longitudinally to the right or left along tracks 52 by the reciprocal action of piston 360.

In a similar manner, a right hand traverse hydraulic cylinder 30 is shown in FIGURE 1. As had been stated heretofore, the purpose of the right hand traverse hydraulic cylinder 30 is to differentially position the right hand carriage assembly 20 in accordance with the length and position of a railroad tie 314 which is elevationally and transversely centered in the tie assembly upon adjustable tie support structures 28. It should be appreciated that the carriage assemblies are longitudinally positioned so that their horizontal and vertical pressing plates will peripherally clamp the tie proximate the terminal ends thereof. Right hand traverse hydraulic cylinder 30 is provided with a piston 374 which is reciprocally mounted therewithin in accordance with the supply of pressurized fluids to suitable end plates 372 or 373. Piston 374 is provided with an appropriate mounting head for fixed connection to lug 166 of the right hand carriage assembly 20. End 373 is provided with a suitable bifurcated mounting projection 376. In addition, a bracket 378 is welded to the tie press frame assembly 12 and is shown projecting upwardly therefrom. The bifurcated mounting projection 376 of the right hand traverse hydraulic cylinder is fixedly attached to the cylinder bracket 378 by way of pin 379. Therefore, depending on whether pressurized fluid is supplied to end 372 or 373, piston 374 will reciprocate in accordance therewith to selectively position the right hand carriage assembly 20 along longitudinal tracks 52.

FIGURE 8 illustrates in schematic fashion the hydraulic mechanism for actuation of the various apparatus components. Since the control valves and the cylinders of the hydraulic assembly are similar, in the interest of brevity only the action of one will be described, with as much of the remaining structure being described as will be necessary for understanding of the invention. More-over, since a detailed description was made of horizontal surface hydraulic clamp cylinder 240 and vertical surface clamp cylinder 280 of press sub-assembly 26 in connection with the description of FIGURES 3 and 4, a detailed description of the structure and operation of the same will not be repeated at this point. In FIGURE 8, the various cylinders for the press sub-assemblies, the left traverse cylinder, the right traverse cylinder and the end press are diagramatically shown by a cylinder-piston arrangement. The press sub-assembly 26 associated with left hand carriage assembly 22 is provided with a vertical surface hydraulic clamp cylinder 280 and a horizontal surface hydraulic clamp cylinder 240 into which is slidably mounted a piston 260 having a head 262. As shown and discussed hereinabove, piston 260 and piston head 262 is slidably longitudinally movable within the cylinder 240. A pair of flexible hydraulic lines 248 and 250 alternately supply pressurized fluids to opposite sides of the piston 260.

Hydraulic fluid from a suitable source 38 is pressurized by a pump 400 driven from an electric motor 404. Fluid from the pump outlet passes to a four-position control valve, a bank of the same being shown by the numeral 40 in FIGURES 1 and 8.

The pump outlet is also connected to a high pressure relief valve 406 having a relief outlet connected either to a suitable sump or to the input side of the pump 400. While the valves could have been either of the manual or solenoid operated variety, the drawing illustrates the invention with the use of valves which are manually actuatable by levers 408 in FIGURE 1. As illustrated in FIGURE 8, each of the hydraulic cylinders is provided with a manually operated control valve. For purposes of simplicity, the control valve 410 associated with the selective operation of left hand carriage horizontal cylinder 240 will be described. As shown, in FIGURE 8, valve 410 is normally in its center or neutral position 416. Section 414 is the forward or clamp section, whereas 418 is the return or reverse section. In the center neutral section 416, the input line 420 is connected directly to the sump or return line 422.

The output side of the control valve connects to extensions of hydraulic lines 248 and 250. Lines 248 and 250 of course carry pressurized fluid to cylinder 240 in accordance with the position of the valve 410.

When the operator moves a selected manual lever 408 of FIGURE 1 in a downward direction a corresponding movement will be experienced by the hydraulics valves of FIGURE 8. Accordingly, assuming that valve 410 has been selected, the downward movement of lever 408 results in section 414 being positioned between the inlet and outlet ports so that high pressure fluid is supplied through line 248 to the top of position head 262 to drive the same outwardly and accordingly move its associated pressing platen 286 in a clamped position about the periphery of railroad tie 314. Conversely, when the operator manually moves control lever 408 in an upwardly direction reverse section 418 will be brought into communication with the valve inlet and outlet ports so that high pressure is now supplied by way of line 250 to the hydraulic cylinder 240 to urge the piston in an inwardly direction relative thereto. Accordingly, the associated pressing platen 286 will be returned to its original position away from railroad tie 314.

In operation, a railroad tie or any other lumber structure into whose opposite ends connector plates 17, see FIGURE 5, are desired to be driven, will be placed upon the arcuate support surfaces 330 and 332 of adjustable tie supports 28. The proper number of shims 338, 340, and 342 will then be placed between the frame supports 326 and 328 and the support sub-assemblies 320 and 324. The railroad tie will then be elevationally and transversely centered upon adjustable railroad tie supports 28. The left hand traverse hydraulic cylinder 32 and the right hand traverse hydraulic cylinder 30 will then be longitudinally moved along associated tracks 52 by manual actuation of a pair of levers 408 by the operator to position the side press assemblies proximate the longitudinal ends of tie rod 314. Upon the right hand and left hand carriage assemblies assuming their desired longitudinal position, the left traverse cylinder 32 and right traverse cylinder 30 are deactivated so that longitudinal movement by a pressing operation is permitted. Immediately upon the carriage assemblies assuming their desired longitudinal positions, side press assemblies 26 are operatively activated. Upon manual operation of the proper manual levers, the control valves will be positioned such that a forward pressing motion is transmitted to the associated pistons of horizontal hydraulic clamp cylinder 240, horizontal hydraulic clamp cylinder 240', vertical hydraulic clamp cylinder 280, and vertical hydraulic clamp cylinder 280', see FIGURE 1. Upon actuation of the piston for slidable movement in an outward direction relative to the associated cylinders, the horizontal clamp pressing platens 284 and 284', and vertical clamp pressing platens 312 and 312' will be moved to engage the peripheral vertical and horizontal side of railroad tie 314. Thereafter, in accordance with the description of operation hereinabove mentioned, the pressure plates 184 and 198 of the side press assemblies 28, see FIGURES 3 and 4, will be moved to engaging position relative to the other horizontal and vertical peripheral surfaces of railroad tie 314. Accordingly, the railroad tie will be clamped along the peripheral horizontal and vertical edges proximate the longitudinal ends thereof.

By this time connector plates 17 are being magnetically held to end pressing platens 16 and 16a. Thereafter, end press hydraulic cylinder 36 is manually actuated by operation of an appropriate lever 408 by the operator. In response to positioning of the forward section of the appropriate control valve pressurized fluid will be transmitted to cylinder 36 to drive pressure plate 16 in a forward direction. Upon engagement between end pressure plate 16 and the longitudinal end of railroad tie 314, since the left hand and right hand carriage assemblies 22 and 20 are respectively in an unlocked position to permit free longitudinal repositioning along tracks 52, movement of the lumber element 314 and carriage assemblies toward pressure plate 16a, will occur. Upon railroad tie 314 engaging and being embedded on the toothed plate carried by the platen 16a, further movement of the lumber element and left hand and right hand carriage assemblies comes to a halt. The connector plates 17 are accordingly pressed into longitudinal ends of the railroad tie. The movable platen 16 is then withdrawn, the clamping presses are retracted and the carriage assemblies 20 and 22 are withdrawn, and the wooden element may be removed from the apparatus. In the usual mode of operation a series of similar wooden elements are reinforced whereby the original adjustment of the positioning units 28 will serve for the entire series which may be treated in rapid fashion. Where desired the entire operation may be automated so that the actuation of a simple start button will suffice for the entire operation. That is to say, the various valves in the control unit 40 may readily be solenoid actuated by relatively simple switching well known to those skilled in the art. If desired the sequence of such operation may then be controlled by any of a series of known sequencing devices. By way of example, one such sequence switching device is shown in United States Patent No. 2,803,012, issued Aug. 20, 1957. Others are equally adaptable.

With such an automated arrangement, the operator positions the railroad tie or other wooden element and then presses the cycle instituting button. This then sequentially causes the carriages 20 and 22 to assume their proper positions, causes the horizontal and vertical surface presses to clamp the surfaces of the wooden element adjacent the ends thereof, causes the cylinder 32 to be activated to drive home the toothed plates, causes the cylinder 32 and clamping presses to retract, causes the carriages 20 and 22 to return to their positions beyond the end of the wooden element, and finally causes the control switching device to reach the end of its cycle.

It is apparent from the above that the present invention provides a novel apparatus for manufacturing reinforced wooden elements of relatively simple, inexpensive construction and one that may be easily manipulated by even the most inexperienced and unskilled operators. While a number of toothed connectors may be used with the apparatus and method, the preferred type is that generally shown and described in United States Patent No. 2,877,520, issued Mar. 17, 1959, to John C. Jureit. For the purposes of this apparatus and method, the plates preferably should be of 14 to 18 gauge still having a large plurality of elongated nail-like teeth struck therefrom and disposed more or less uniformly over the surface of the plate.

The invention may be embodied in other specific forms without departing from the spirit or essential characteristics thereof. The present embodiments are therefore to be considered in all respects as illustrative and not restrictive, the scope of the invention being indicated by the appended claims, rather than by the foregoing description and all changes which come within the meaning and range of equivalency of the claims are therefore intended to be embraced therein.

What is claimed and desired to be secured by United States Letters Patent is:

1. A machine for reinforcing an elongated lumber element comprising, means for supporting said lumber element, first press means disposed about said lumber element adjacent one end thereof for applying pressure to opposed surfaces thereof, second press means disposed about said lumber element adjacent the other end thereof for applying pressure to opposed surfaces thereof, platen means for carrying toothed reinforcing plates adjacent both ends of said lumber element, and means for moving said platen means relative to said lumber element to embed the teeth of said plates in the ends of said lumber element.

2. A machine as set out in claim 1 including means for moving said press means longitudinally of said lumber element.

3. A machine as set out in claim 1 wherein each of said press means includes means for applying pressure to two pairs of opposed surfaces.

4. A machine as set out in claim 3 wherein each said press means comprises a pair of presses each having a pair of opposed platens, at least one of which is movable, one press in each pair moving its movable platen along a path substantially perpendicular to the path of movement of the platen of the other press in said pair.

5. A machine as set out in claim 4 including means for moving said press means longitudinally of said lumber element.

6. A machine as set out in claim 5 wherein said last named means comprises a pair of hydraulically actuated pistons.

7. A machine as set out in claim 1 wherein said platen means includes resilient mounting means to permit conformity of said platen means to irregular lumber surfaces.

8. A machine as set out in claim 1 wherein each said press means includes at least one platen means wherein said platen means includes resilient mounting means to permit conformity of said platen means to irregular lumber surfaces.

9. A machine as set out in claim 3 wherein said press means are movable longitudinal of a wooden element on said supporting means.

10. A machine as set out in claim 9 including means for positioning said press means beyond the ends of a lumber element on said supporting means, moving said press means towards one another so that said press means are adjacent the ends of said lumber element, moving said platen means relative to said lumber element to embed the teeth of said plates in said lumber element, withdraw said platen means relative to said lumber element, and move said press means away from one another to positions beyond the ends of said lumber element.

11. A machine as set out in claim 10 wherein the movement of said platen means comprises the movement of one platen toward the end of the lumber element whereby the lumber element is moved toward a stationary platen, said movement of said lumber element being simultaneous with longitudinal movement of said press means.

12. A machine as set out in claim 4 including a first press carriage for said first press means and a second press carriage for said second press means, each carriage means being movably mounted for movement substantially parallel to the axis of a lumber element on said support, each carriage means having mounted thereon a first cylinder having a piston driving one of said movable platens and a second cylinder having a piston driving one of said movable platens, the axes of said pistons being substantially perpendicular.

13. A machine as set out in claim 12 wherein said cylinders are mounted on said carriage means by means of carriage sub-assemblies movably mounted on said carriage means for movement in at least two different directions at substantially right angles relative to one another.

14. A machine as set out in claim 13 wherein said carriage sub-assemblies are attached to said carriage assemblies by means which return said sub-assemblies to a predetermined rest position after said movement of said sub-assemblies.

15. A machine as set out in claim 14 wherein said last named means comprise bars pivotally attached to said sub assemblies and attached to said carriages for pivotal and slidable motion with respect thereto under the influence of spring action.

16. A machine as set out in claim 11 including a first press carriage for said first press means and a second press carriage for said second press means, each carriage means being movably mounted for movement substantially parallel to the axis of a lumber element on said support, each carriage means having mounted thereon a first cylinder having a piston driving one of said movable platens and a second cylinder having a piston driving one of said movable platens, the axes of said pistons being substantially perpendicular.

17. A machine as set out in claim 16 wherein said cylinders are mounted on said carriage means by means of carriage sub-assemblies movably mounted on said carriage means for movement in at least two different directions at substantially right angles relative to one another.

18. A machine as set out in claim 17 wherein said carriage sub-assemblies are attached to said carriage assemblies by means which return said sub-assemblies to a predetermined rest position after said movement of said sub-assemblies.

19. A machine as set out in claim 18 wherein said last named means comprise bars pivotally attached to said sub-assemblies and attached to said carriages for pivotal and slidable motion with respect thereto under the influence of spring action.

20. A machine as set out in claim 19 wherein said presses and said means for moving said first named platen means are hydraulically actuated.

21. A machine for reinforcing an elongated lumber element comprising, support means, lumber positioning means for positioning an elongated lumber element relative to said support means, a pair of carriages movably mounted on said support means for movement substantially parallel to the axis of a lumber element on said positioning means, press means associated with each of said carriages, said carriages being movable so as to position said press means in first positions beyond the ends of lumber element on said positioning means and in second positions within the ends of said lumber element for clamping said lumber element, and additional press means for embedding toothed plates in the ends of a lumber element clamped by said first mentioned press means.

22. A machine as set out in claim 21 wherein actuation of said additional press means causes longitudinal movement of said lumber element and longitudinal movement of said first named press means and associated carriages.

23. A machine as set out in claim 21 wherein said press means are mounted on said carriages by means of sub-carriages movable relative to said carriages.

24. A machine as set out in claim 23 wherein said sub-carriages are movable in at least two directions substantially at right angles to one another and substantially at right angles to the longitudinal axis of said lumber element.

25. A machine as set out in claim 24 wherein each sub-carriage carries a pair of hydraulic cylinders mounted substantially on axes at right angles to one another, said cylinders performing said clamping.

26. A machine as set out in claim 25 wherein each said cylinder carries a platen including a resilient element permitting the face of said pattern to conform to irregular lumber surfaces.

27. A machine as set out in claim 21 wherein said additional press means includes platens for embedding said plates, each of said platens includes a resilient element permitting the face of said pattern to conform to irregular lumber surfaces.

28. A machine as set out in claim 26 wherein said additional press means includes platens for embedding said plates, each of said platens includes a resilient element permitting the face of said pattern to conform to irregular lumber surfaces.

29. A machine for reinforcing an elongated lumber element comprising first stationary platen means for holding a first toothed plate, second movable platen means opposite said first platen means for holding a second toothed plate, support means for positioning an elongated lumber element between said toothed plates in a substantially horizontally position, means for clamping the ends of said elongated lumber element, and means for moving said movable platen into the end of said lumber element to embed the teeth of both said plates therein while moving said lumber element and said clamping means along the longitudinal axis of said lumber element.

30. A machine as set out in claim 29 wherein said clamping means are movable in three directions substantially at right angles to one another.

References Cited

UNITED STATES PATENTS

| | | | |
|---|---|---|---|
| 2,260,389 | 10/1941 | Lorentzen | 227—152 |
| 3,207,406 | 9/1965 | Bowman | 227—152 |
| 3,103,701 | 9/1963 | Calchera et al. | 100—264 |

TRAVIS S. McGEHEE, *Primary Examiner.*

H. M. CULVER, *Assistant Examiner.*

U.S. Cl. X.R.

144—310

UNITED STATES PATENT OFFICE
CERTIFICATE OF CORRECTION

Patent No. 3,419,205

December 31, 1968

John C. Jureit et al.

It is certified that error appears in the above identified patent and that said Letters Patent are hereby corrected as shown below:

Column 2, line 12, "spitting" should read -- splitting --; line 39, "subjected" should read -- subject --. Column 9, line 10, "28" should read -- 228 --. Column 10, line 4, "160" should read -- 260 --. Column 12, line 42, "had" should read -- has --. Column 12, line 25, "outlet" should read -- output --. line 48, "hydraulics" should read -- hydraulic --. Column 14, line 17, "piston" should read -- pistons --. Column 18, line 10, "horizontally" should read -- horizontal --.

Signed and sealed this 10th day of March 1970.

(SEAL)
Attest:

Edward M. Fletcher, Jr.
Attesting Officer

WILLIAM E. SCHUYLER, JR.
Commissioner of Patents